(12) United States Patent
Desai et al.

(10) Patent No.: US 12,185,096 B2
(45) Date of Patent: Dec. 31, 2024

(54) PROVIDING RESTRICTIONS IN COMPUTER-GENERATED REALITY RECORDINGS

(71) Applicant: Apple Inc., Cupertino, CA (US)

(72) Inventors: Ranjit Desai, Cupertino, CA (US); Maneli Noorkami, Menlo Park, CA (US); Joel N. Kerr, San Jose, CA (US)

(73) Assignee: Apple Inc., Cupertino, CA (US)

( * ) Notice: Subject to any disclaimer, the term of this patent is extended or adjusted under 35 U.S.C. 154(b) by 478 days.

(21) Appl. No.: 17/016,110

(22) Filed: Sep. 9, 2020

(65) Prior Publication Data

US 2021/0073357 A1    Mar. 11, 2021

Related U.S. Application Data

(60) Provisional application No. 62/897,907, filed on Sep. 9, 2019.

(51) Int. Cl.
| | |
|---|---|
| *G06F 21/00* | (2013.01) |
| *G06F 21/14* | (2013.01) |
| *G06F 21/62* | (2013.01) |
| *G06T 5/20* | (2006.01) |
| *G06T 5/70* | (2024.01) |
| *G06V 20/00* | (2022.01) |
| *G06V 20/20* | (2022.01) |
| *G06V 40/10* | (2022.01) |
| *G06V 40/16* | (2022.01) |
| *H04W 12/02* | (2009.01) |

(Continued)

(52) U.S. Cl.
CPC ............ *H04W 12/02* (2013.01); *G06F 21/14* (2013.01); *G06F 21/6218* (2013.01); *G06T 5/20* (2013.01); *G06T 5/70* (2024.01); *G06V 20/00* (2022.01); *G06V 20/20* (2022.01); *G06V 40/10* (2022.01); *G06V 40/161* (2022.01); *G06F 21/1015* (2023.08); *G06Q 20/14* (2013.01); *G06T 2207/30201* (2013.01)

(58) Field of Classification Search
None
See application file for complete search history.

(56) References Cited

U.S. PATENT DOCUMENTS 8,910,201 B1 * 12/2014 Zamiska ............. H04N 21/458
                                                            725/60
11,511,199 B2 * 11/2022 Marchiorello ...... A63F 13/5255
(Continued)

OTHER PUBLICATIONS

International Scarch Report and Written Opinion from PCT/US2020/050003, dated Nov. 5, 2020, 13 pages.
(Continued)

*Primary Examiner* — Jeffery L Williams
(74) *Attorney, Agent, or Firm* — BAKERHOSTETLER

(57) ABSTRACT

Implementations of the subject technology provides analyzing a recording of content within a field of view of a device, the analyzing including recognition of a set of objects included in the content. The subject technology identifies a subset of the set of objects that are indicated as corresponding to protected content. The subject technology generates a modified version of the recording that obfuscates or filters the subset of the set of objects. Additionally, the subject technology provides the modified version of the recording to a host application for playback.

24 Claims, 6 Drawing Sheets

(51) Int. Cl.
*G06F 21/10* (2013.01)
*G06Q 20/14* (2012.01)

(56) References Cited

U.S. PATENT DOCUMENTS

| | | | |
|---|---|---|---|
| 2016/0147492 A1* | 5/2016 | Fugate | G06F 3/1423 |
| | | | 345/633 |
| 2017/0337352 A1 | 11/2017 | Williams | |
| 2018/0107835 A1* | 4/2018 | Clement | A63F 13/212 |
| 2018/0107839 A1* | 4/2018 | Clement | G06F 3/017 |
| 2018/0173882 A1* | 6/2018 | Hamilton | H04L 63/10 |
| 2018/0190032 A1 | 7/2018 | Barnett et al. | |
| 2019/0019011 A1 | 1/2019 | Ross et al. | |
| 2020/0244996 A1* | 7/2020 | Iyer | H04N 19/513 |
| 2021/0064774 A1* | 3/2021 | Collart | G06T 19/20 |
| 2021/0073357 A1* | 3/2021 | Desai | G06V 20/20 |
| 2021/0103340 A1* | 4/2021 | Bradski | G02B 27/0093 |
| 2023/0039323 A1* | 2/2023 | Marchiorello | A63F 13/798 |

OTHER PUBLICATIONS

European Office Action from European Patent Application No. 20780448.5, dated May 6, 2024, 5 pages.

\* cited by examiner

PROVIDING RESTRICTIONS IN COMPUTER-GENERATED REALITY RECORDINGS

CROSS REFERENCE TO RELATED APPLICATIONS

This application claims the benefit of priority to U.S. Provisional Patent Application No. 62/897,907, entitled "Providing Restrictions in Computer-Generated Reality Recordings," filed on Sep. 9, 2019, the disclosure of which is hereby incorporated herein in its entirety.

TECHNICAL FIELD

The present description relates generally to computer-generated reality environments.

BACKGROUND

Augmented reality technology aims to bridge a gap between virtual environments and a physical environment by providing an enhanced physical environment that is augmented with electronic information. As a result, the electronic information appears to be part of the physical environment as perceived by a user. In an example, augmented reality technology further provides a user interface to interact with the electronic information that is overlaid in the enhanced physical environment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
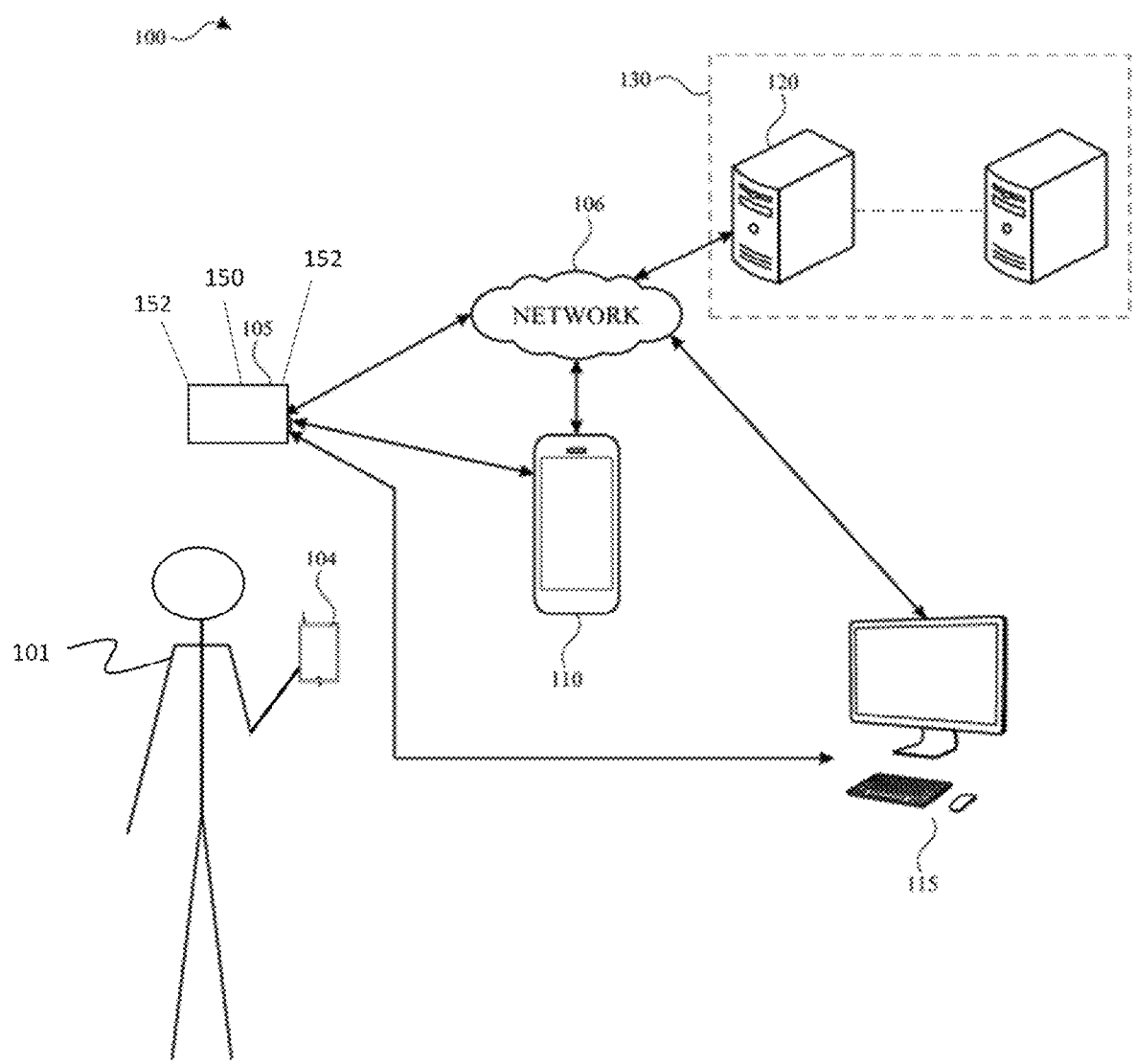
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A computer-generated reality (CGR) system enables physical and virtual environments to be combined in varying degrees to facilitate interactions from a user in a real-time manner. Such a CGR system, as described herein, therefore can include various possible combinations of physical and virtual environments, including augmented reality that primarily includes physical elements and is closer to a physical environment than a virtual environment (e.g., without physical elements). In this manner, a physical environment can be connected with a virtual environment by the CGR system. A user immersed in an CGR environment can navigate through such an environment and the CGR system can track the user's viewpoint to provide a visualization based on how the user is situated in the environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's body and/or head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and a virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over a portion of the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over a portion of the physical environment and/or behind a portion of the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include mobile devices, tablet devices, projection-based systems, heads-up displays (HUDs), head mounted systems, vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets or tablet devices, and desktop/laptop computers. For example, a head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide a CGR system that provides restriction of content in a given CGR recording based at least in part on determining objects that correspond to protected content and/or user profile information including information indicating privacy preferences. In this manner, the subject system enables segmenting out particular components of a scene in the CGR recording that are restricted. Such components include physical objects and/or virtual objects that correspond to restricted components in the scene. The subject system can modify the CGR recording to filter or obscure the restricted components and provide the CGR recording for playback on a given host application.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices, and any number of servers or a data center including multiple servers.

The electronic device 105 may be implemented, for example, as a tablet device, a handheld and/or mobile device, or as a head mounted portable system (e.g., worn by a user 101). The electronic device 105 includes a display system capable of presenting a visualization of a computer-generated reality environment to the user. The electronic device 105 may be powered with a battery and/or another power supply. In an example, the display system of the electronic device 105 provides a stereoscopic presentation of the computer-generated reality environment, enabling a three-dimensional visual display of a rendering of a particular scene, to the user. In one or more implementations, instead of, or in addition to, utilizing the electronic device 105 to access a computer-generated reality environment, the user may use a handheld electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User input detected by such sensors and/or hardware elements correspond to, for example, various input modalities for initiating a co-presence session from within an application. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc.

In one or more implementations, the electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the computer-generated reality environment may be offloaded to the base device thereby reducing processing burdens on the electronic device 105. For instance, in an implementation, the electronic device 105 works in conjunction with the electronic device 110 or the electronic device 115 to generate a computer-generated reality environment including physical and/or virtual objects that enables different forms of interaction (e.g., visual, auditory, and/or physical or tactile interaction) between the user and the generated computer-generated reality environment in a real-time manner. In an example, the electronic device 105 provides a rendering of a scene corresponding to the computer-generated reality environment that can be perceived by the user and interacted with in a real-time manner, such as a host environment for a co-presence session with another user. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the computer-generated reality environment. Examples of such events include detecting a presence of a particular person, entity, or object in the scene. In response to the detected event, the electronic device 105 can provide annotations (e.g., in the form of metadata) in the computer-generated reality environment corresponding to the detected event.

In an implementation, the electronic device 105 generates a recording of a physical environment and generates a computer-generated reality environment including two-dimensional (2D) video for sharing and playback. In another implementation, the electronic device 105 generates a recording, and subsequently generates a three-dimensional (3D) representation merging information from all sensors and/or combining recording with other users' recordings (e.g., different point of views (POVs)). It is further appreciated that the electronic device 110 and/or the electronic device 115 can also generate such computer-generated reality environments either working in conjunction with the electronic device 105 or independently of the electronic device 105.

The network 106 may communicatively (directly or indirectly) couple, for example, the electronic device 104, the electronic device 105, the electronic device 110, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a computer-generated reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 6. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 6.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for computer-generated reality environments. In an implementation, the server 120 may function as a cloud storage server that stores any of the aforementioned computer-generated reality content generated by the above-discussed devices and/or the server 120.

In an implementation, the server 120 may provide a secure environment corresponding to a secure cloud environment discussed further below for analyzing a recording of CGR content. Such a recording may be provided by at least one of the electronic device 105, the electronic device 110, and/or the electronic device 115. Similarly, the electronic device 105, the electronic device 110, and/or the electronic device may also provide a secure environment for analyzing a recording of CGR content as discussed further below in FIG. 2.

Figure 2:
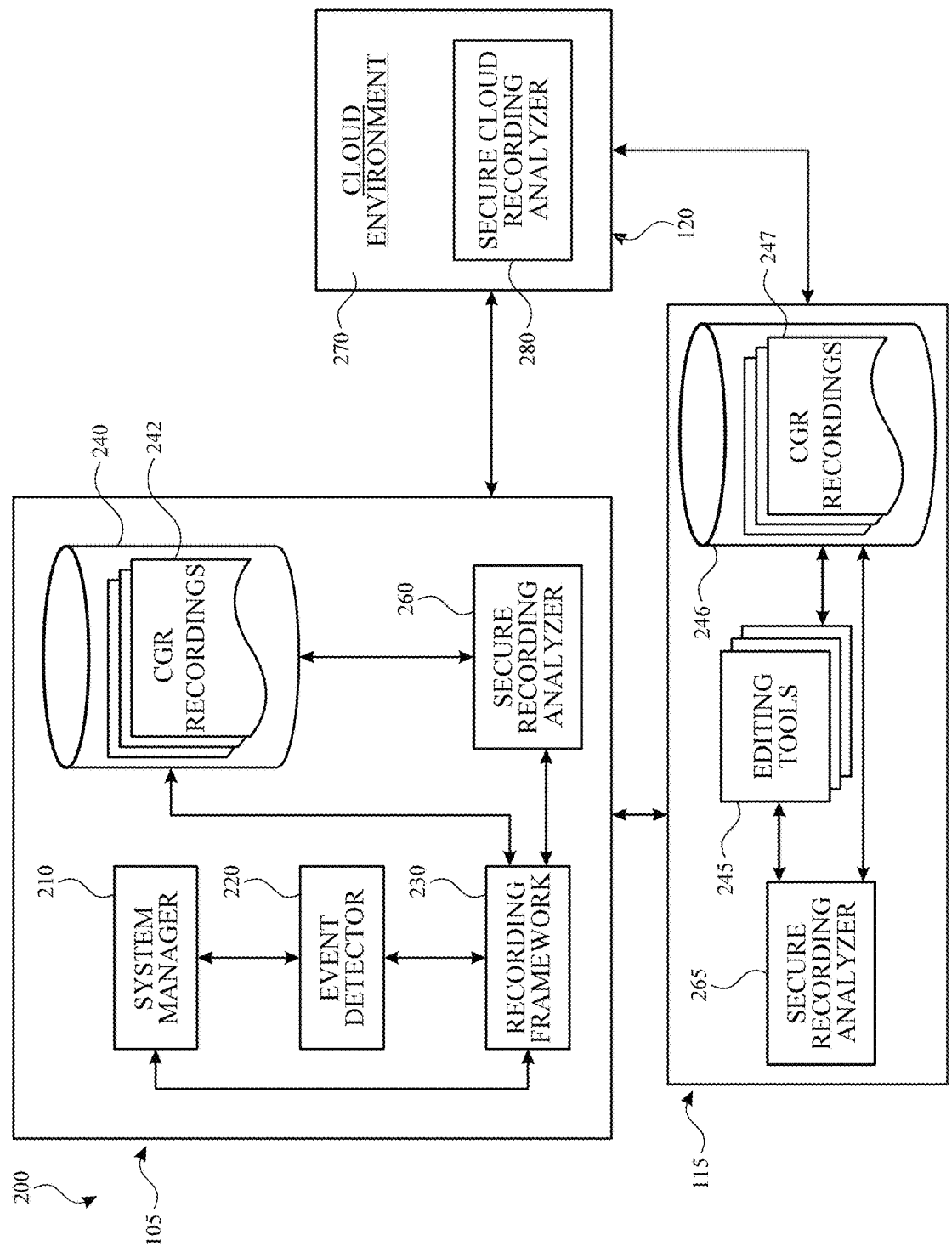
FIG. 2 illustrates an example software architecture that may be implemented on an electronic device and/or a server in accordance with one or more implementations of the subject technology.

FIG. 2 illustrates an example software architecture 200 that may be implemented on the electronic device 105, the electronic device 115, and the server 120 in accordance with one or more implementations of the subject technology. For explanatory purposes, the software architecture 200 is described as being implemented by the electronic device 105, the electronic device 115, and the server 120 of FIG. 1, such as by a processor and/or memory of the electronic device 105, electronic device 115, and the server 120; however, appropriate portions of the software architecture 200 may be implemented by any other electronic device, including the electronic device 110. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The software architecture 200, as implemented on the electronic device 105, includes a framework. A framework, as used herein, can refer to a software environment that provides particular functionality as part of a larger software platform to facilitate development of software applications, and may provide one or more application programming interfaces (APIs) that may be utilized by developers to design, in a programmatic manner, computer-generated reality environments and to handle operations for such computer-generated reality environments.

As illustrated, a recording framework 230 is provided. The recording framework 230 may provide functionality to record a computer-generated reality environment provided by the input modalities as discussed above. An event detector 220 is provided that receives information corresponding to input from the various input modalities. A system manager 210 is provided to monitor resources from the electronic device 105 and determine a quality of service metric based on available resources. The system manager 210 can make decisions for selecting particular hardware components, corresponding to respective input modalities, to activate and/or deactivate in view of the quality of service metric. For example, a camera used to track facial expressions can be turned off, or another camera used to track hand gestures can be turned off. When particular hardware is deactivated, the electronic device 105 may provide a notification to alert the user that a particular input modality is unavailable. Similarly, the electronic device 105 may provide a notification to alert the user that a particular input modality is available upon activating particular hardware.

In an implementation, the software architecture 200 enables managing CGR recordings by providing a repository or storage location to upload such recordings. As illustrated in FIG. 2, the electronic device 105 includes a database 240 for storing CGR recordings 242, which may be provided by the recording framework 230 and/or a secure recording analyzer 260 discussed further below. The recording framework 230, in an example, may generate a CGR recording and encrypt such a recording for storing in the database 240.

Implementations of the software architecture 200, and components thereof, enable the automatic segmenting of CGR recordings based on content and annotations which also enables the recordings to be searchable. Further, the software architecture 200, and components thereof, enables recommendations of other recordings to be provided based at least in part on a topic and/or interest of a user, which may be provided in a user preference stored in an associated user profile. The software architecture 200, and components thereof, enable multiple recordings to be generated based on recommendations or based on user preferences, and also enable random browsing of recordings (pause, playback, seek, etc.)

In an example, a secure recording analyzer 260 may receive a given CGR recording from the recording framework 230, or receive a request from the recording framework 230 to retrieve the CGR recording stored in the database 240. The secure recording analyzer 260 analyzes recordings and generates metadata and/or annotations based on the analysis. The secure recording analyzer 260, in an implementation, can execute specific classifiers for object detection, and determine motion vectors of objects if such objects are moving during the recording. The secure recording analyzer 260 provides annotations of the recording (e.g., tagged with metadata information) to objects and when events are detected or persons are detected and/or recognized. Further, the analysis can also be tailored depending on type of recording (e.g., sports, particular location such as the beach, etc.) to target specific events or objects that are likely to be present in the type of recording.

In an implementation, the secure recording analyzer 260 analyzes recordings to identify protected items for determining restrictions in CGR content. Such protected items can be pre-tagged as being protected, or based on whether a user viewing a CGR recording has sufficient access privileges to a given item (e.g., paid content, age-restricted content, violent content, etc.), or whether persons detected in a CGR recording have a privacy flag enabled. The secure recording analyzer 260 may return information based on the analysis to the recording framework 230 (or alternatively a given editing tool) to facilitate generating a modified CGR recording. In an example, using this information, the recording framework 230 determines which virtual items to not include in a scene and/or physical objects to be obfuscated and/or not included in the scene in order to generate the modified CGR recording. As used herein, physical objects are representations of objects that are captured by a camera within the scene.

Further, in an implementation, different user profiles may be provided based on access level. For example, a user may have various profiles for different access levels including a public profile, private profile, profile for friends/family, work profile, etc. Using the profile information, the user's avatar can be rendered in accordance with the user profile appropriate for the scene and depending on which other users are viewing the CGR recording. Moreover, during playback, the CGR recording may be filtered or adjusted (e.g., slow down or tone down) based on a pulse rate or other input (e.g., heart rate, gaze, pupil dilations) of the user viewing the CGR recording.

In an implementation, segmenting persons and/or objects in a given CGR recording can be dependent on the operating mode of the electronic device 105 (e.g., plugged in, wireless, standalone). Post processing therefore may be performed (e.g., analyzing the CGR record as discussed above) when the original recording is limited due to hardware or resource constraints during recording, and may also occur in the cloud (e.g., to take advantage of deeper neural networks and/or other machine learning algorithms) on a continuous basis. In particular, as user profile changes, the aforementioned cloud algorithms can continue to learn user preferences. In another example, when the user is traveling, the subject technology enables adjusting a rendering of a given CGR recording to further adapt to territorial rights that may have changed due to different geographical location(s).

As also shown, the server 120 provides a cloud environment 270. The cloud environment 270 may use its own set of processors (e.g., CPU and/or GPU). In an implementation, the server 120 includes a secure cloud recording analyzer 280 which performs the same or similar functionality to the secure recording analyzer 260 discussed above on a given CGR recording. In one example, the server 120 may receive a request from the electronic device 105 to perform an analysis of a given CGR recording. The results of any analysis (e.g., generated metadata information or recommendations) performed by the secure recording analyzer 260 can be returned to the electronic device 105 for further processing.

In an implementation, the electronic device 115 includes a secure recording analyzer 265, which may respectively perform the same functionality as described above in connection with the secure recording analyzer 260 of the electronic device 105. For example, the secure recording analyzer 260 may analyze a CGR recording from one of the CGR recordings 247 stored in a database 246.

As illustrated, the electronic device 115 includes a set of tools 245 that correspond to various editing tools (e.g., specific applications) that provide editing functionality to modify CGR recordings. Each editing tool may be capable of receiving a CGR recording (e.g., corresponding to one of the CGR recordings 247 stored in a database 246) for editing. Examples of an editing tool include an image editor, a tool for 3D composition, and/or a multimedia editor that enables organization of CGR content along a timeline. A given editing tool may also enable insertion of new objects or content into a scene, including new virtual content.

Although not illustrated in FIG. 2, it is appreciated that the electronic device 110 may also include similar components as those discussed in connection with the electronic device 115 above.

In an implementation, algorithms discussed herein baked into silicon (e.g., face detection); but also software based algorithms. Further, implementations of the subject technology, including any of the aforementioned electronic devices, can utilize special purpose hardware (e.g., encoding hardware, GPU, specific processor for accelerating neural networks and machine learning operations, etc.).

The following discussions relate to examples of analyzing various computer-generated reality recordings, to determine restrictions that are utilized to generate modified recordings for playback.

Examples of analyzing a computer-generated reality recording and generating a restricted computer-generated reality recording in accordance with implementations of the subject technology are discussed below. The following discussion relates to components of the software architecture 200 in FIG. 2.

In an example, a scene shows a meeting taking place in a conference room that is included in a computer-generated reality (CGR) recording. In the scene, a person is giving a presentation in a region corresponding to a whiteboard in the conference room. The presentation in the region, in an example, may be virtual content that is rendered for visual presentation on the whiteboard in the CGR recording.

In this example, a secure recording analyzer (e.g., the secure recording analyzer 260 or 265, or the secure cloud recording analyzer 280) analyzes the scene and determines that the virtual content on the whiteboard is protected content and that a user who has requested to view the CGR recording does not have sufficient access privileges, based on the user's current access level, to view the content on the whiteboard. The secure recording analyzer can provide information related to the analysis in the form of metadata to the recording framework 230 or an editing tool for further processing. Using the provided information, the recording framework 230 or the editing tool can generate a modified version of the CGR recording.

In an example, a second scene, which corresponds to a modified version of the scene, may have been generated (e.g., by a particular editing tool or host application, or the recording framework 230) as part of a modified CGR recording based at least in part on information generated from the above-discussed analysis of the CGR recording. In the second scene 320, virtual content on the whiteboard has been rendered to obfuscate the protected content previously shown in the scene. In this manner, the protected content, when viewed by a user with insufficient access privileges, is not shown to the user.

The following discussion relates to examples of analyzing a computer-generated reality recording and generating a restricted computer-generated reality recording in accordance with implementations of the subject technology. The following discussion relates to components of the software architecture 200 in FIG. 2.

In an example, a scene shows a particular indoor environment (e.g., music concert with a rock band) that is included in a computer-generated reality (CGR) recording. In the scene, a rock band is playing a concert in a region corresponding to an area above a stage. The region, in an example, may be considered protected content that requires specific access privileges (e.g., viewing user has to pay a fee to view the region) in order to view the rock band.

In this example, a secure recording analyzer (e.g., the secure recording analyzer 260 or 265, or the secure cloud recording analyzer 280) analyzes the scene and determines that the content in the region is protected content and that a user who has requested to view the CGR recording does not have sufficient access privileges, based on the user's current access level, to view the content in the region. In one or more implementations, determining protected content in a scene is based on detecting a tag, performing object recognition, and/or detecting a protected object (which may be tagged as being protected). The secure recording analyzer can provide information related to the analysis in the form of metadata to the recording framework 230 or an editing tool for further processing. Using the provided information, the recording framework 230 or the editing tool can generate a modified version of the CGR recording.

Using the associated metadata information, the recording framework 230 or editing tool can generate a modified version of the CGR recording. In an example, such metadata information may include information indicating the location of the object in the scene, information regarding the type of object (e.g., a classification), information of the size of the object, and/or any other appropriate information that helps identify or locate the object in the scene including descriptors of the object that the recording framework 230 utilizes to distinguish the object. In FIG. 4B, a second scene, which corresponds to a modified version of the scene, may have been generated (e.g., by a particular editing tool or host application, or the recording framework 230) based at least in part on information generated from the above-discussed analysis of the CGR recording. In the second scene, virtual content 422 has been rendered to obfuscate the protected content (e.g., the rock band) previously shown in the scene. In this manner, the protected content, when viewed by a user with insufficient access privileges, is not shown to the user. In this example, the user may interact with the system and pay the necessary fee in order to view the rock band. Once the fee payment transaction is verified, the rendering of the computer-generated reality environment during playback instead resembles the scene thereby enabling the user to view the rock band playing the concert. In an implementation, the aforementioned restrictions (e.g., obfuscations or removal of content) are applied in a manner that is reversible to enable eliminating the restrictions at a future time.

Figure 3A:
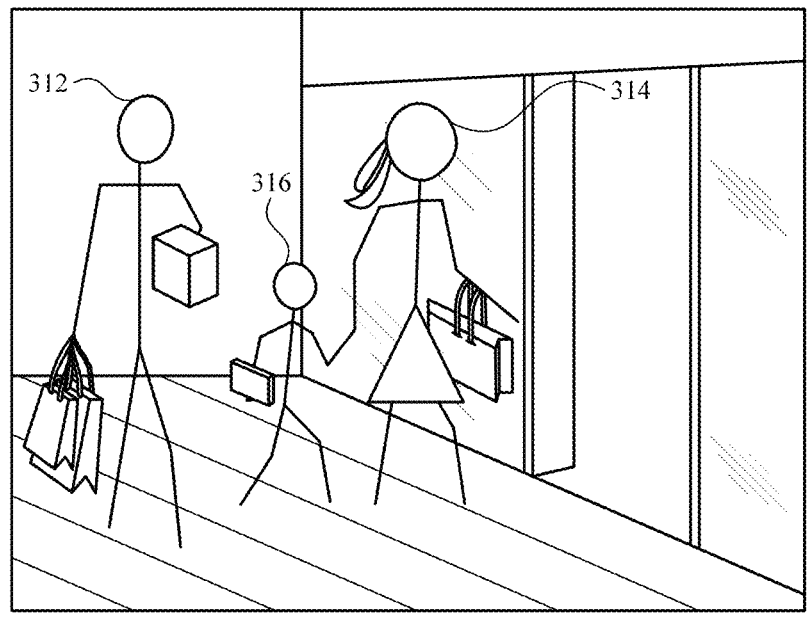
FIGS. 3A and 3B illustrate examples of analyzing a computer-generated reality recording and generating a restricted computer-generated reality recording based on a user profile with privacy information in accordance with implementations of the subject technology.
Figure 3B:
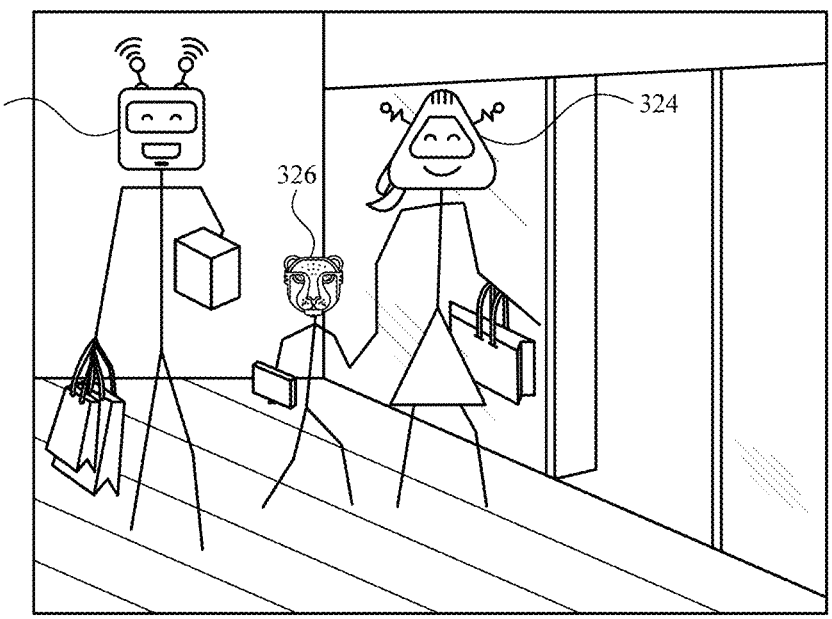

FIGS. 3A and 3B illustrate examples of analyzing a computer-generated reality recording and generating a restricted computer-generated reality recording based on a user profile with privacy information in accordance with implementations of the subject technology. The following discussion relates to components of the software architecture 200 in FIG. 2.

In the example of FIG. 3A, a secure recording analyzer (e.g., the secure recording analyzer 260 or 265, or the secure cloud recording analyzer 280) analyzes the scene 310 and determines a privacy related attribution to identified persons in the scene 310. In the scene 310, a person 312 corresponding to an adult male, a person 314 corresponding to an adult female, and a person 316 corresponding to a male child are present and have been successfully identified. In an example, the secure recording analyzer is able to determine the respective identities of three persons in the scene 310 based at least in part on a respective associated device that each person may be carrying and/or using.

Each of the identified persons may have an associated user profile for a particular avatar to display when the person is included in a particular scene for viewing by a different user. For example, a person may have a profile for contacts, a profile for work, a profile for friends and family, a public profile, a personal profile, etc., which dictate a type of avatar for rendering in the scene with respect to the viewing user of the scene. Alternatively, in cases in which identification of one or more persons in a given scene is not successful, the scene may be rendered to obfuscate the face(s) (e.g., by blurring the face) of the person(s) and indicate that such a person is not known or recognized.

Each of the users corresponding the person 312, the person 314, and the person 316 can also set a privacy filter in their user profile information. When such a privacy filter is set, the representation of the user rendered in a scene may be anonymized such that the user cannot be easily identified through visual means. In an example, when the privacy filter is set in the user profile, the rendering of the user's avatar (e.g., based on the type of profile with respect to the viewing user) as discussed above is not applicable.

The secure recording analyzer can provide information related to the analysis in the form of metadata to the recording framework 230 or an editing tool for further processing. Using the provided information, the recording framework 230 or the editing tool can generate a modified version of the CGR recording.

Using the associated metadata information, the recording framework 230 or editing tool can generate a modified version of the CGR recording. In FIG. 3B, a scene 320, which corresponds to a modified version of the scene 310, may have been generated (e.g., by a particular editing tool or host application, or the recording framework 230) based at least in part on information generated from the above-discussed analysis of the CGR recording. In the scene 320, an avatar 322, an avatar 324, and an avatar 326 have been rendered for display in the scene 320. The avatars in the example of FIG. 3B may have been selected for displaying to the user viewing the scene 320 based on associated user profile information corresponding to the person 312, the person 314, and the person 316 previously identified in the scene 310. In this manner, respective avatars may be included in the rendering of the modified CGR recording based at least in part on user profile information and/or privacy settings.

Figure 4:
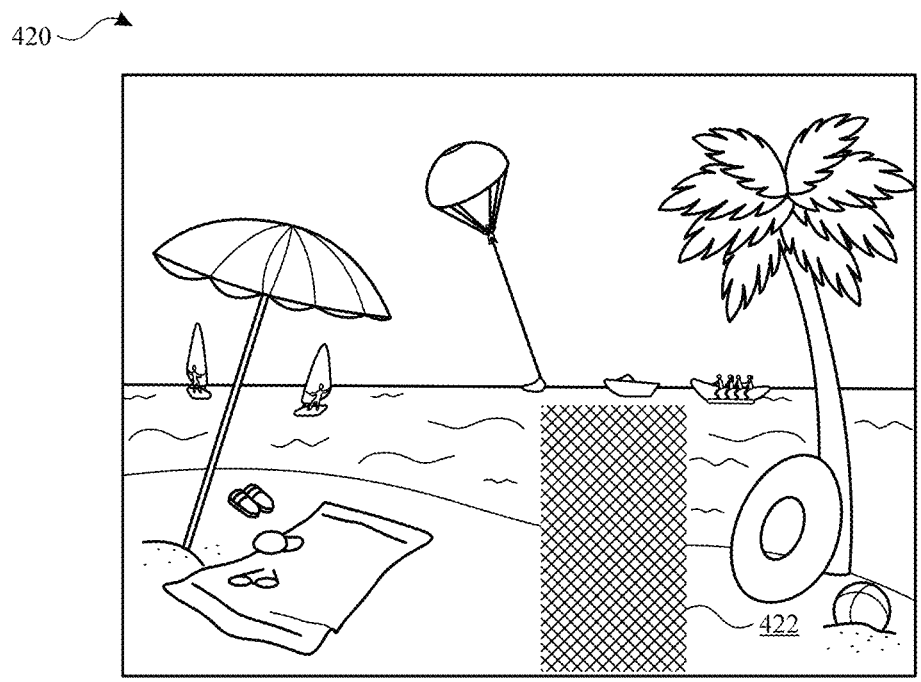
FIG. 4 illustrate examples of analyzing a computer-generated reality recording and generating a restricted computer-generated reality recording based on a user profile with restriction information in accordance with implementations of the subject technology.

FIG. 4 illustrate examples of analyzing a computer-generated reality recording and generating a restricted computer-generated reality recording based on a user profile with restriction information in accordance with implementations of the subject technology. The following discussion relates to components of the software architecture 200 in FIG. 2.

In an example, a secure recording analyzer (e.g., the secure recording analyzer 260 or 265, or the secure cloud recording analyzer 280) analyzes the scene and determines that the content in the region is restricted content (e.g., based on an age of a viewing user) and that a user who has requested to view the CGR recording does not have sufficient access privileges, based on the user's profile information, to view the content in the region. In an example, the age restriction can be determined based on a tag that indicates the minimum age for viewing the content. The secure recording analyzer can provide information related to the analysis in the form of metadata to the recording framework 230 or an editing tool for further processing. Using the provided information, the recording framework 230 or the editing tool can generate a modified version of the CGR recording.

Using the associated metadata information, the recording framework 230 or editing tool can generate a modified version of the CGR recording. In FIG. 4, a scene 420, which corresponds to a modified version of another scene, may have been generated (e.g., by a particular editing tool or host application, or the recording framework 230) based at least in part on information generated from the above-discussed analysis of the CGR recording. In the scene 420, virtual content 422 has been rendered to obfuscate the restricted content (e.g., two men engaging in fisticuffs) that may have been previously shown in the scene. In this manner, the restricted content, when viewed by a user with insufficient access privileges, is not shown to the user. In this example, the user is not shown restricted content corresponding to a violent event because the user's profile information indicates that the user is not of a sufficient age to view such violent content. Such a restriction may be set by the system, or through another user that has security privileges to the user's account, such as a parent or guardian of the user.

Figure 5:
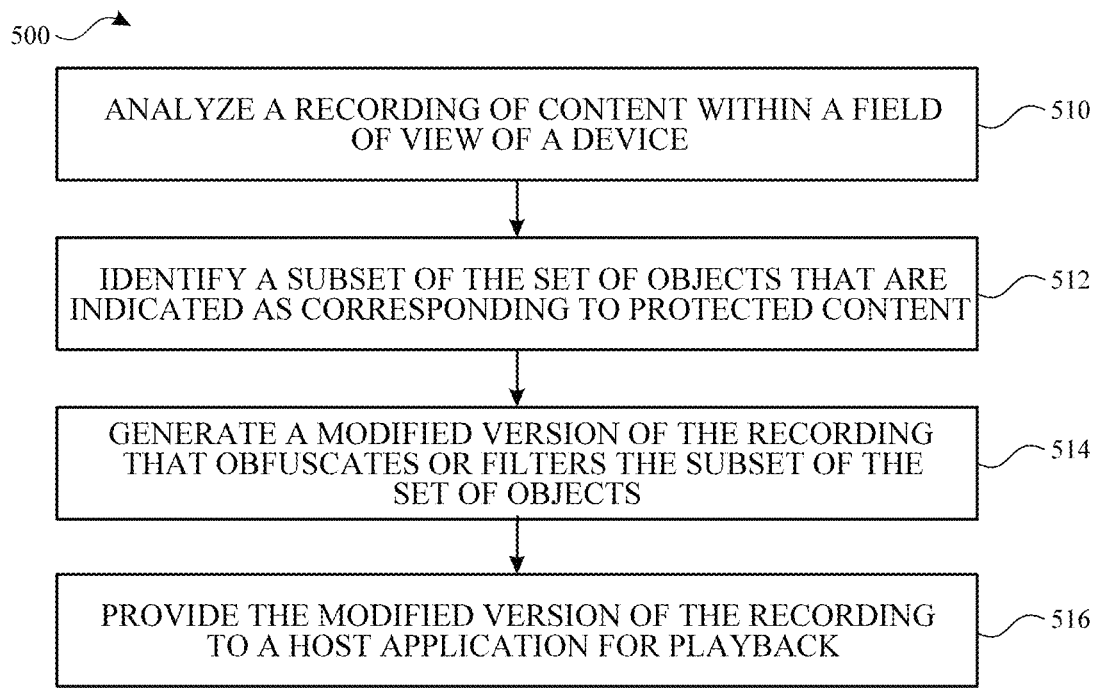
FIG. 5 illustrates a flow diagram of an example process for analyzing a recording of computer-generated reality content in accordance with implementations of the subject technology.

FIG. 5 illustrates a flow diagram of an example process 500 for analyzing a recording of computer-generated reality content in accordance with implementations of the subject technology. For explanatory purposes, the process 500 is primarily described herein with reference to the electronic device 105 of FIGS. 1 and 2. However, the process 500 is not limited to the electronic device 105 of FIGS. 1 and 2, and one or more blocks (or operations) of the process 500 may be performed by one or more other components of other suitable devices, including the electronic device 105, the electronic device 110, and/or the server 120. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As illustrated in FIG. 5, the electronic device 105 analyzes a recording of content within a field of view of a device, the analyzing including recognition of a set of objects included in the content (510). In an example, the field of view corresponds to the extent of the observable world that is visible to the user in the CGR environment. The field of view can be measured in degrees, and the higher (e.g., the greater the degree) that the field of view of the device is, the further the virtual world will extend to the edge of the vision of the user. The electronic device 105 identifies a subset of the set of objects that are indicated as corresponding to protected content (512). The electronic device 105 generates a modified version of the recording that obfuscates or filters the subset of the set of objects (514). The electronic device 105 provides the modified version of the recording to a host application for playback (516).

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 6:
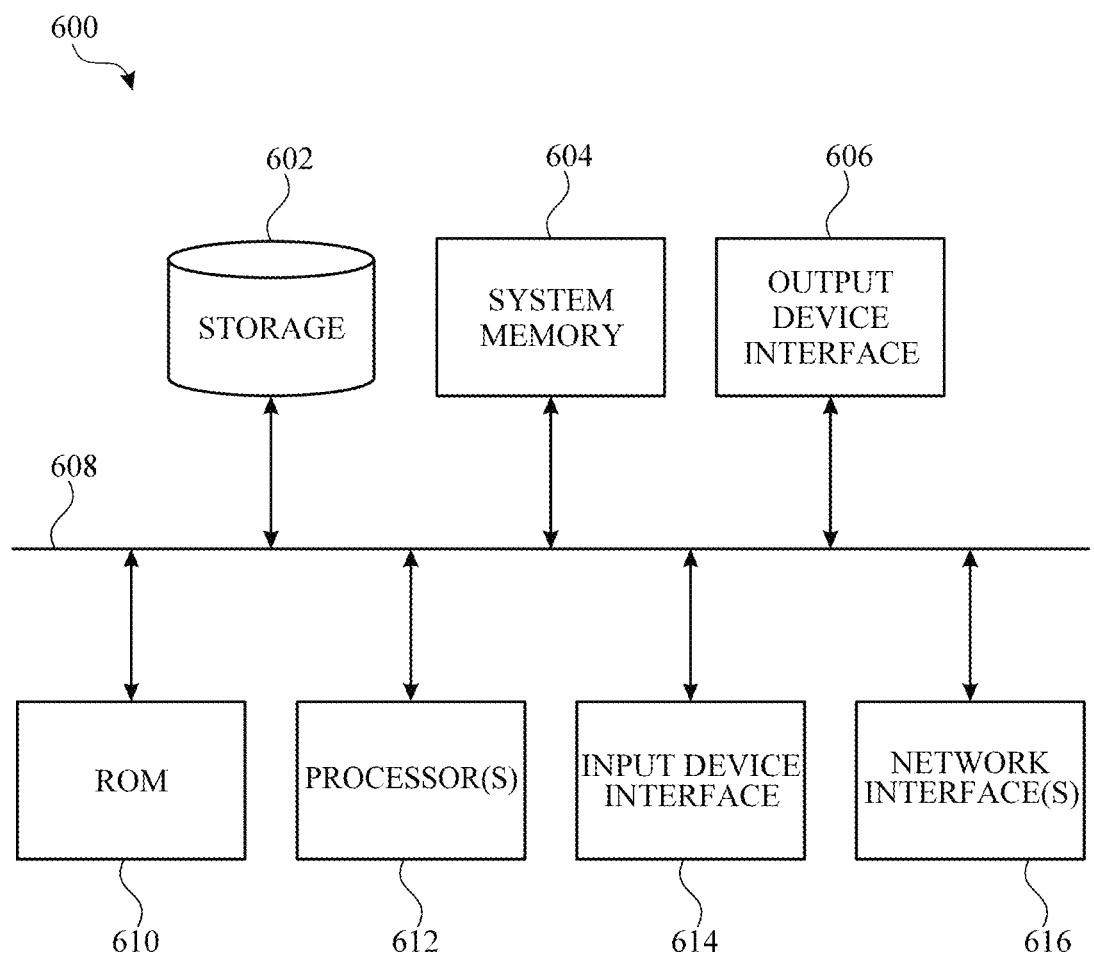
FIG. 6 illustrates an electronic system with which one or more implementations of the subject technology may be implemented.

FIG. 6 illustrates an electronic system 600 with which one or more implementations of the subject technology may be implemented. The electronic system 600 can be, and/or can be a part of, the electronic device 105, the electronic device 104, the electronic device 110, the electronic device 115, and/or the server 120 as shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the electronic device 110 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method comprising:
    retrieving, from a database, a recording of content of a physical environment corresponding to a field of view of a device, the content comprising a composited video that includes at least one virtual object composited with video comprising at least one physical object;
    analyzing the recording of content of the physical environment corresponding to the field of view of the device, the analyzing including recognition of a set of objects included in the content and determining if a respective motion vector associated with each respective object corresponds to object movement, and the analyzing comprising generating one or more annotations based at least in part on the recording of content from the physical environment and one or more privileges of a user account;
    identifying, based on the generated one or more annotations, a subset of the set of objects that are indicated as corresponding to protected content, the subset of the set of objects including the at least one virtual object and the at least one physical object;
    generating a modified version of the recording that obfuscates or filters the subset of the set of objects; and
    providing the modified version of the recording to a host application for playback to a user associated with the user account.

2. The method of claim 1, wherein the device comprises a computer-generated reality display device configured to display content to another user.

3. The method of claim 1, wherein identifying the subset of the set of objects that are indicated as corresponding to protected content further comprises:
    determining, based at least in part on the generated one or more annotations, that each object from the subset of the set of objects includes content that requires a user to provide an additional monetary fee for the user to view.

4. The method of claim 1, further comprising:
    identifying a region in a scene of the recording that corresponds to protected content.

5. The method of claim 1, wherein identifying the subset of the set of objects that are indicated as corresponding to protected content further comprises:
    determining a particular access level, corresponding to the user, for viewing protected content; and
    determining, based at least in part on the generated one or more annotations, that the particular access level is insufficient for viewing the subset of the set of objects that are indicated as corresponding to protected content.

6. The method of claim 1, wherein at least one object of the subset of the set of objects is pre-tagged prior to analyzing the recording as corresponding to the protected content.

7. The method of claim 1, wherein analyzing the recording of content from the physical environment further comprises:
    performing face detection on a representation of a person in the recording to identify the person as a particular user; and
    generating an annotation that indicates that the person is the particular user;
    identifying the subset of the set of objects that are indicated as corresponding to protected content further comprises:
        determining, based at least in part on the annotations, that the representation of the person included in the recording corresponds to the particular user; and
        determining that the particular user is associated with a privacy flag that indicates that a face of the representation of the person should be obscured; and
    generating the modified version of the recording that obfuscates or filters the subset of the set of objects comprises:
        obscuring the face of the representation of the user in the modified version of the recording.

8. The method of claim 1, wherein generating the modified version of the recording that obfuscates or filters the subset of the set of objects further comprises:
    generating a rendering of a scene in the recording that is missing the subset of the set of objects.

9. The method of claim 1, wherein generating the modified version of the recording that obfuscates or filters the subset of the set of objects further comprises:
    generating a rendering of a scene in the recording that provides a blurred visual representation of the subset of the set of objects.

10. A system comprising:
    a processor;
    a memory device containing instructions, which when executed by the processor cause the processor to perform operations comprising:

retrieving, from a database, a recording of content of a physical environment corresponding to a field of view of a device, the content comprising a composited video that includes at least one virtual object composited with video comprising at least one physical object;

analyzing the recording of content from a of the physical environment corresponding to the field of view of the device, the analyzing including recognition of a set of objects included in the content and determining if a respective motion vector associated with each respective object corresponds to object movement, and the analyzing comprising generating one or more annotations based at least in part on the recognized set of objects and one or more privileges of a user account;

identifying, based on the generated one or more annotations, a subset of the set of objects that are indicated as corresponding to protected content, the subset of the set of objects including the at least one virtual object and the at least one physical object;

generating a modified version of the recording that obfuscates or filters the subset of the set of objects; and providing the modified version of the recording to a host application for playback to a user associated with the user account.

11. The system of claim 10, wherein the device comprises a computer-generated reality display device configured to display content to another user.

12. The system of claim 10, wherein identifying the subset of the set of objects that are indicated as corresponding to protected content causes the processor to perform further operations further comprising:

determining that each object from the subset of the set of objects includes content that requires a user to provide an additional monetary fee for the user to view.

13. The system of claim 12, wherein the memory device contains further instructions, which when executed by the processor further cause the processor to perform further operations further comprising:

identifying, based at least in part on the generated one or more annotations, a region in a scene of the recording that corresponds to protected content.

14. The system of claim 10, wherein identifying the subset of the set of objects that are indicated as corresponding to protected content causes the processor to perform further operations further comprising:

determining a particular access level, corresponding to a user, for viewing protected content; and determining, based at least in part on the generated one or more annotations, that the particular access level is insufficient for viewing the subset of the set of objects that are indicated as corresponding to protected content.

15. The system of claim 14, wherein the particular access level is based on an age restriction for viewing protected content.

16. The system of claim 10, wherein identifying the subset of the set of objects that are indicated as corresponding to protected content causes the processor to perform further operations further comprising:

determining, based at least in part on the generated one or more annotations, that a representation of a person included in the recording corresponds to a particular user, the particular user associated with an indication of a privacy filter to obscure a rendering of a face of the representation of the person.

17. The system of claim 10, wherein generating the modified version of the recording that obfuscates or filters the subset of the set of objects causes the processor to perform further operations further comprising:

generating a rendering of a scene in the recording that is missing the subset of the set of objects.

18. A non-transitory computer-readable medium comprising instructions, which when executed by a computing device, cause the computing device to perform operations comprising:

retrieving, from a database, a recording of content of a physical environment corresponding to a field of view of a device, the content comprising a composited video that includes at least one virtual object composited with video comprising at least one physical object;

analyzing the recording of content of the physical environment corresponding to the field of view of the device, the analyzing including recognition of a set of objects included in the content and determining if a respective motion vector associated with each respective object corresponds to object movement and the analyzing comprising generating one or more annotations corresponding to the recognized set of objects;

identifying, based on the generated one or more annotations, a subset of the set of objects that are indicated as corresponding to protected content, the subset of the set of objects including the at least one virtual object and the at least one physical object;

generating a modified version of the recording that obfuscates or filters the subset of the set of objects; and providing the modified version of the recording to a host application for playback.

19. The non-transitory computer-readable medium of claim 18, wherein identifying the subset of the set of objects that are indicated as corresponding to protected content further comprises:

determining, based at least in part on the generated one or more annotations, that each object from the subset of the set of objects includes content that requires a user to provide an additional monetary fee for the user to view.

20. The non-transitory computer-readable medium of claim 18, wherein the operations further comprise:

identifying, based at least in part on the generated one or more annotations, a region in a scene of the recording that corresponds to protected content.

21. The method of claim 1, further comprising:

generating the modified version of the recording that obfuscates or filters the subset of the set of objects based at least in part on a user context.

22. The method of claim 1, wherein the use context comprises a geographic location of the user and the method further comprising:

determining that the geographic location of the user has changed; and responsive to the determining, generating another modified version of the recording based on content restrictions associated with the changed geographic location of the user.

23. The method of claim 1, wherein the user context comprises a relationship between another user account of the particular user and the user account of the user and the identifying the subset of the set of objects that are indicated as corresponding to protected content further comprises:

determining, based at least in part on the annotations, that a representation of a person included in the recording corresponds to a particular user; and generating the modified version of the recording that obfuscates or filters the subset of the set of objects comprises:

determining the relationship between the other user account of the particular user and the user account of the user;

based at least in part on the determined relationship, selecting one of a plurality of avatars corresponding to the particular user; and replacing the representation of the particular user in the recording with the selected one of the plurality of avatars.

24. The method of claim 1, further comprising:

during playback of the recording to the user, filtering the recording based on a heart rate of the user.

* * * * *

UNITED STATES PATENT AND TRADEMARK OFFICE
CERTIFICATE OF CORRECTION

| | | |
|---|---|---|
| PATENT NO. | : 12,185,096 B2 | Page 1 of 1 |
| APPLICATION NO. | : 17/016110 | |
| DATED | : December 31, 2024 | |
| INVENTOR(S) | : Ranjit Desai et al. | |

It is certified that error appears in the above-identified patent and that said Letters Patent is hereby corrected as shown below:

On the Title Page

Under OTHER PUBLICATIONS:
Replace "International Scarch Report", with --International Search Report--.

In the Claims

Column 21, Line 7 (Claim 10):
Replace "of content from a of", with --of content of--.

Signed and Sealed this
Twenty-ninth Day of April, 2025

Coke Morgan Stewart
*Acting Director of the United States Patent and Trademark Office*